United States Patent
Goris et al.

(10) Patent No.: US 8,209,273 B2
(45) Date of Patent: Jun. 26, 2012

(54) AUTOMATICALLY EVALUATING AND RANKING SERVICE LEVEL AGREEMENT VIOLATIONS

(75) Inventors: Rob Goris, Maassluis (NL); Laurent S. Mignet, New Delhi (IN); Ashwin Srinivasan, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 12/190,166

(22) Filed: Aug. 12, 2008

(65) Prior Publication Data

US 2009/0076992 A1 Mar. 19, 2009

(30) Foreign Application Priority Data

Sep. 19, 2007 (EP) ..................... 07116746

(51) Int. Cl.
G06E 1/00 (2006.01)
G06E 3/00 (2006.01)
G06F 15/18 (2006.01)
G06G 7/00 (2006.01)

(52) U.S. Cl. ......................................................... 706/21
(58) Field of Classification Search .................... None
See application file for complete search history.

(56) References Cited

U.S. PATENT DOCUMENTS

| | | | |
|---|---|---|---|
| 6,917,979 B1 * | 7/2005 | Dutra et al. .................... 709/229 |
| 7,693,982 B2 * | 4/2010 | Goldszmidt et al. ........... 709/224 |
| 2005/0261933 A1 * | 11/2005 | Magnuson ......................... 705/1 |
| 2007/0011121 A1 * | 1/2007 | Bi et al. .......................... 706/20 |
| 2008/0120266 A1 * | 5/2008 | Theis .............................. 706/47 |

* cited by examiner

*Primary Examiner* — Jeffrey A Gaffin
*Assistant Examiner* — Luis Sitiriche
(74) *Attorney, Agent, or Firm* — Owen J. Gamon; Grant A. Johnson

(57) ABSTRACT

The invention relates to ranking Service Level Agreement violations. A method for ranking said Service Level Agreements comprising determining a set of attributes for Service Level Agreements subject to violation, and predicting importance of Service Level Agreement violations using a model which performs ordinal regression based on said attributes of Service Level Agreements.

12 Claims, 3 Drawing Sheets

AUTOMATICALLY EVALUATING AND RANKING SERVICE LEVEL AGREEMENT VIOLATIONS

BACKGROUND OF THE INVENTION

The present invention generally relates to the field of statistical evaluation, especially to the ranking of Service Level Agreement violations.

A Service Level Agreement or SLA is a contractual agreement between two parties on one or more service level objectives. An SLA has business impact for both, the provider of a service and the consumer using the service. A service provider usually has more than one active SLA, either for the same consumer or for a set of consumers.

The acceptance of a violation may not only depend on functional criteria but also on business criteria. It might be better to accept a violation for a less important consumer and shift resources to the more important consumer, than to solve the violation for the less important consumer.

New SLAs violated are reported in real times on most of the monitoring applications. Such real times violations are hard to process as they arrive in any order. The simplest way to rank them is using the arrival order but it does not transcript the real importance of a violations. Users or systems can also decide a rank based on some heuristics but these ranking does not capture fully the information regarding an SLA and its possible impact on the system monitored.

Patent specification U.S. Pat. No. 6,556,659 discloses a process for service level management, including a prioritisation of SLA violations. Prioritisation is based on the number of preceding violations of the respective SLA.

Patent application US 20050256946 discloses a mechanism for minimizing losses due to SLA breaches, including a ranking based on penalty associated with SLA violations. Penalty is a monetary compensation to be paid to the customer for not meeting his SLA requirements.

SUMMARY OF THE INVENTION

Embodiments of the present invention provide a method and a system for ranking of SLA violations, which take into account various attributes, and which allow for easily and reliably ranking of violations as well as quick solving thereof.

A first aspect of the invention provides a computerized method for ranking Service Level Agreement violations, said method comprising the steps of:
  determining a set of attributes for Service Level Agreements subject to violation, and
  predicting importance of Service Level Agreement violations using a model, which performs ordinal regression, based on said attributes of Service Level Agreements.

A second aspect of the invention provides a computer program product comprising a computer useable medium having a computer readable program, wherein the computer readable program when executed on a computer causes the computer to:
  determining a set of attributes for Service Level Agreements subject to violation, and
  predicting importance of Service Level Agreement violations using a model, which performs ordinal regression, based on said attributes of Service Level Agreements.

A third aspect of the invention provides a computer system for ranking Service Level Agreement violations, said system comprising:
  attribute determining component, which determine a set of attributes for Service Level Agreements subject to violation, and
  importance predicting component, which predict importance of the Service Level Agreement violations using a model, which performs ordinal regression, based on said attributes of Service Level Agreements.

BRIEF DESCRIPTION OF THE DRAWINGS

Ranking of SLA violations according to present invention will be explained in closer detail throughout the following by way of an example. Same parts or parts of equal effect are denoted by the same reference numerals. It is shown in.

DETAILED DESCRIPTION

Figure 1:
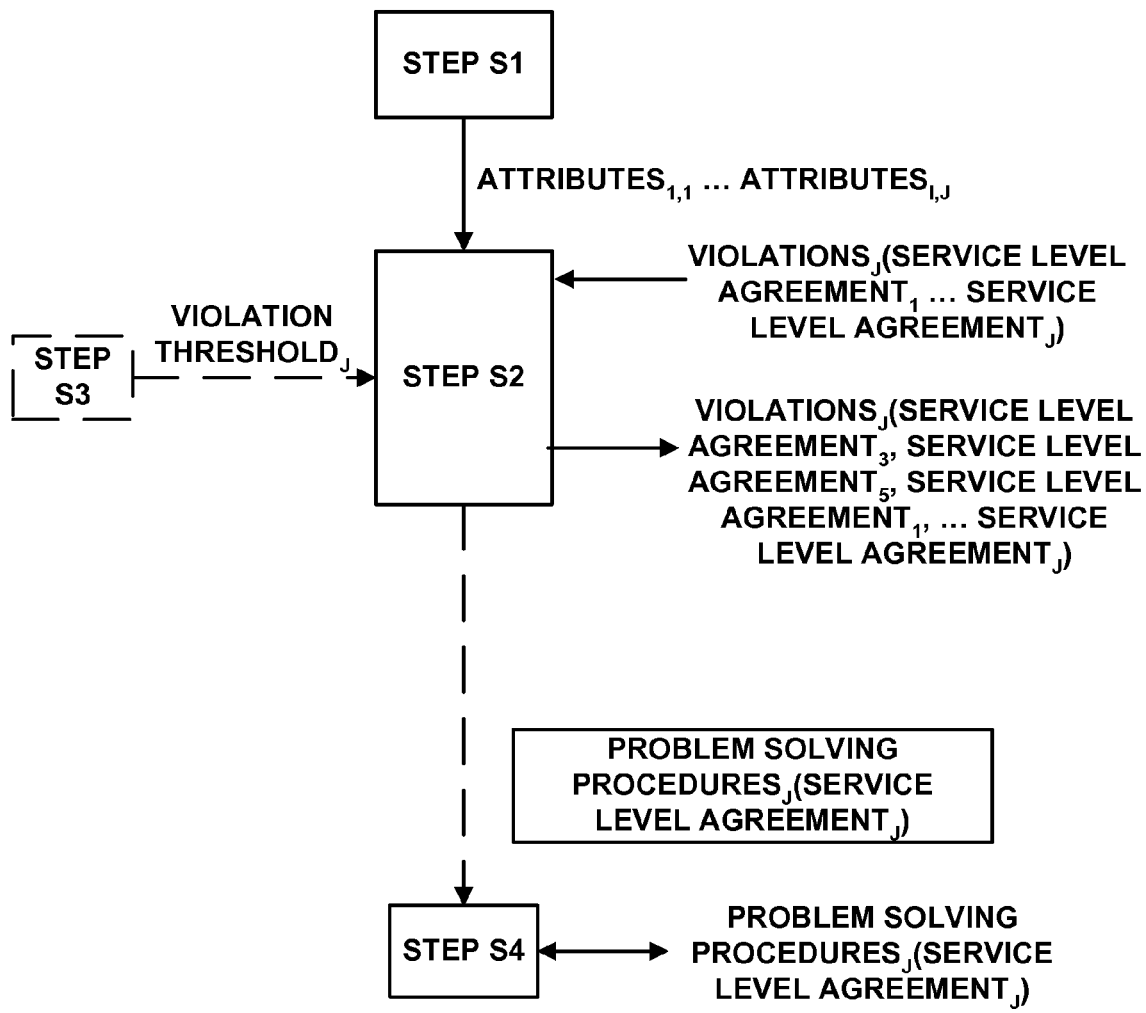
FIG. 1 a flow chart illustrating steps of an inventive method for ranking SLA violations.

In one aspect of the invention there is provided a computerized method for ranking SLA violations, the method comprising the steps of determining a set of attributes for SLAs subject to violation, and predicting importance of SLA violations using a model, which performs ordinal regression based on the attributes of SLAs.

One important point of the inventive method is that SLA violations are based on different criteria. A capability of the method is to take into account very different notions to rank such as the impact of a violation on a specific computer system same as on general business issues.

Within the context of this specification, a 'model performing ordinal regression' is meant to be any system, which allows studying the effects of explanatory variables on all levels of an ordered categorical outcome. Nowadays, statistical software routines are available, for example, in the Statistical Package for the Social Sciences (SPSS) or the Statistical Analysis System (SAS), which make it computationally possible to build the ordinal regression model.

As for the features of such model, first, the outcome variable of interest is a grouped and ordered category that may be grouped from an unobserved continuous latent variable. However, it is not clear whether the ordinal outcome is equally spaced. Second, the ordinal regression analysis employs a link function to describe the effect of the explanatory variables on ordered categorical outcome in such a way that the assumptions of normality and constant variance are not required. Third, the model assumes that the relationship between the explanatory variables and the ordinal outcome is independent of the category because the regression coefficient does not depend on the categories of the outcome variable. In other words, the model assumes that the corresponding regression coefficients in the link function are equal for each cut-off point.

Major decisions involved in constructing the ordinal regression model are deciding what explanatory variables to include in the model equation and choosing link functions that would be the best fit to the data set. Commonly used link functions like logit link or cloglog link may be chosen to build the ordinal regression model.

The inventive method may also comprise a step of predicting importance of the SLA violations using a model, which performs heuristic evaluation based on the attributes of SLAs. Users or computer systems may then also decide a rank based on the heuristics in addition or as an alternative to ordinal regression. This will further improve reliability of predicting the rank of a violation. The model performing heuristic evaluation may further be adjusted, i.e. a user may define a model, the ranking output of which also represents his individual responsibilities and service tasks.

A root cause of an SLA violation may be detected using attributes based on relationships between SLAs subject to violation. This enables detection of a cascading effect and allows to spend times to solve the root causes rather that the effects.

Further steps of the inventive method may comprise logging and reusing problem solving procedures pertaining to SLA violations. Such templates will accelerate solving of problems that already once occurred, the proverbial 'Best Practices'. Furthermore, cascading effects or spend times to solve such problems can be analysed later on.

Problem and warning due to SLA violations occur at irregular intervals. Some violations occur more frequently, other violations occur only once. Some violations need a substantial effort to solve, others are not important, easy to fix or go away automatically over time. Some violations are related to other violations, others do not.

Therefore, in order to cover the most important influences on the ranking of SLA violations, attributes of SLAs comprise at least one of a frequency of occurrence, recursion and age of a problem. 'Recency' is meant to be a factor of importance in the final equation as it influences the probability of negative impact where there is still a possibility to avoid further impact. Recursion is relevant as it considers recurring events that might cause damage at certain time slots although they can disappear without intervention. The term 'age' is to be understood as the time between now and the last time an exception occurred. In short, the younger the last violation, the more likely it is that it has a high impact.

The inventive method further aims to rank attributes of SLAs, which may comprise at least one of a business or system impact, problem solving effort (PSE) and relation to other problems. This covers an even broader range of influences on the ranking of SLA violations. Business impact is dependent of the agreement signed between the parties involved in the SLA and the overall SLA agreements than one company has agreed on. Though, in most of the cases the agreement provides a list of penalties to the side guaranty ing the SLA as consequences of violating the term of the SLA.

Business impact may therefore be measured based on a mapping of pecuniary or legal penalties which are provided by an SLA to loss of profit or increased costs effected thereby. Loss of profit may also be caused by loss of reputation.

Similarly, system impact may be measured based on a mapping of system violations to loss of profit or increased costs effected thereby. Impact on the system is different of business impact in that the system impact measures the lost of business due to the SLA violations when business impact measures the possible financial penalties that the violator might be legally bond when a SLA is violated.

In both of the above ranking of business and/or system impact, loss of profit or increased costs may be represented using a domain of integer as well as a domain of real values. However, for simplicity of implementation, it is preferred to use a domain of integer values. For instance, a mapping between business impact using e.g. financial liabilities to a domain of integer may be constructed for our method purposes. Such mapping can either be linear or any other mapping and users can tailor the mapping to be sure that it suits their needs.

Possible units for impact and PSE may be dollars or any other currency, as negative impact causes loss of profit or increased costs. However, those phenomenons have to be looked at in conjunction with time as the effects tend to grow over time. For example, downtime initially, e.g. within the first few minutes, only affects a limited number of users. Over time the number of affected users grows linearly or even exponentially, with returning customers re-experiencing down time. The same applies to PSE, since problems are easier to fix in early stages. As symptoms grow larger, the PSE increases because more time is needed for problem solving. Finally, the relation between violations will intervene as a constant factor making sure that root violations will be ranked higher than violation being direct or indirect consequences of these violations. This arborescence of problems can either be entered by a domain expert at different stages of the process as well as be learned by the system using a method outside the scope of this invention.

Present invention does not explicitly address the problem of constructing such arborescence or estimating the PSE and impact. Though, the proposed model can be extended to refine the different estimate using user feedback.

All of the above attributes combined—once again, other attributes can be easily integrated—can be used to predict a degree of importance on which violations will be ranked. The list of attributes is not exhaustive and the proposed method is not limited to this list.

In order to increase variance, the inventive method may comprise a step of defining products of attributes as an attribute for predicting SLA violations. Building products of criteria makes it easier to rank them.

The method may further comprise a step of defining violation thresholds for attributes. Thus, thresholds may be set by the user for important system counters and periodic exceptions occurring in case a threshold is violated.

The inventive method is preferably used for monitoring performance of a database. Within such method, a neural network may be employed for predicting importance of SLA violations.

In a further aspect of present invention there is provided a computer system for ranking SLA violations, the system comprising attribute determining means, which determine a set of attributes for SLAs subject to violation, and importance predicting means, which predict importance of the SLA violations using a model which performs ordinal regression based on said attributes of SLA. The inventive system preferably comprises threshold definition means, which define violation thresholds for attributes of SLAs subject to violation. A further advantage resides in providing a logging and retrieving means, which may log and retrieve problem solving procedures pertaining to SLA violations.

As mentioned already above, attributes of a very simple ranking model may consist of a combination of business impact, PSE, impact on the system and frequency associated with a weight of the SLA to capture possible arborescence of SLA. Although such model might work in most of the cases it does not fully capture all the attributes that one may consider.

According to the invention, in order to build a more general model of predicting (automatically) the rank of a violating SLA, using the values of some set of attributes requires constructing a model M-OR (Model-Ordinal Regression) that performs ordinal regression. This refers to predicting one of a set of discrete classes (here, the rank of an SLA) with a linear ordering. The task requires not just maximizing accuracy, but also minimizing the distance between the actual and predicted classes. The problem has been studied for some time in the statistical sciences, (see, for example, McCullagh, P., Regression models for ordinal data, Journal of the Royal Statistical Society, B, 42:109-142, 1980) and more recently within machine learning. This includes the use of neural networks (Mathieson, M. J., Ordinal models for risk assessment, Proceedings of the UK Institute for Quantitative Investment Research Autumn seminar, 1995), support vector machines (Herbrich, R., Graepel, T., and Obermayer, K., Support Vector Learning for Ordinal Regression, Proceedings of the Ninth International Conference on Artificial Neural Networks, pp 97-102, 1999) and tree-based models (Kramer, S., Widmer, G., Pfahringer, B. and De Groeve, M., Prediction of Ordinal Classes Using Regression Trees, Fundamenta Informaticae, 21:1001-1013, 2001; Frank and Hall, A Simple Approach to Ordinal Classification, Proceedings of the European Conference on Machine Learning, pp 145-165, 2001). Of these, tree-based models are probably the best suited to the problem of predicting the rank of violating SLAs, since they make very few assumptions about the data, and the result is constructed from one or more human-comprehensible models (trees). Specifically, we believe a slight generalization of the approach described by Frank and Hall (2001) would be adequate for the problem, which is elaborated further below. All the publications referred to above in this passage are hereby incorporated by reference.

The construction of the model M-OR for predicting the rank of a violating SLA using class-probability trees would proceed as follows.

Assume that we are provided with 'training data' consisting of values for a set of attributes $A_1 \ldots A_n$ for an SLA and its rank. The attributes could be frequency of violation, impact, problem solving effort and so on, wherein the values could be numbers or nominal values. The rank of the SLA could be from a total or partial ordering provided ab initio. For convenience, we will denote the values of attribute $A_i$ for $SLA_j$ as $A_{i,j}$, and the rank of $SLA_j$ as $R_j$. Thus, the training data for $SLA_j$ can be represented by the vector $[A_{1,j}, \ldots A_{n,j}, R_j]$. The task is to construct a model that can predict ranks of SLAs given vectors of this form.

Assume that SLA ranks range from $1 \ldots k$. The training data are now converted into $(k-1)$ training data sets $T_1, \ldots, T_{(k-1)}$. Data in $T_i$ for $SLA_j$ is represented by the vector $[A_{1,j}, \ldots A_{n,j}, C_{i,j}]$ where $C_{i,j}=1$ if $R_j>I$, and 0 otherwise. Each such $T_i$ can be used to construct a class probability model using any appropriate method like a class-probability tree builder, logistic regression or a Naïve Bayes classifier, that for any $SLA_j$ can provide an estimate of $Pr(R_j>i|A_{1,j}, \ldots A_{n,j})$. The actual rank of the SLA can then be obtained from these probability estimates in the following manner, wherein for simplicity, we leave out the conditional $A_{1,j}, \ldots, A_{n,j}$:

$$P_{1,j}=Pr(R_j=1)=1-Pr(R_j>1)$$

$$\ldots$$

$$P_{i,j}=Pr(R_j=i)=Pr(R_j>i-1)-Pr(R_j>i) 1<i<k$$

$$\ldots$$

$$P_{k,j}=Pr(R_j=k)=Pr(R_j>k-1)$$

Then the rank prediction for $SLA_j$ is argmax $(P_{1,j}, P_{2,j}, \ldots P_{k,j})$ FIG. 1 shows a flow chart illustrating steps of an inventive method for ranking SLA violations $V_j (SLA_1 \ldots SLA_j)$ based on the above model M-OR. The method is applied in the domain of database performance monitoring, wherein in a first step S1 it is determined, which attributes $A_{1,1} \ldots A_{i,j}$ for $SLA_1 \ldots SLA_j$ subject to violation are to be inputted to the model M-OR. In a further step S2 it is predicted, based on the model M-OR described above, the ranking of detected violations $V_j (SLA_1 \ldots SLA_j)$, which is outputted to be $V_j (SLA_3, SLA_5, SLA_1, \ldots SLA_j)$. Thus, contrary to current database performing monitoring applications, exceptions are no longer presented to the administrator chronologically but are further rated or prioritised. This makes it easy to decide which exceptions deserve immediate action and which can wait or do not need action at all. The administrator is guided in focusing time and effort on those exceptions that matter most.

In a further optional step S3, individually defined thresholds $VT_j$ (Violation Threshold) may be set up by a database administrator for e.g. important system counters and periodic exceptions, which occur in case a threshold $VT_j$ is violated. This allows for individually weighting rank predictions according to specific responsibilities and tasks of the administrator. In a further step S4, problem-solving procedures $PSP_j (SLA_j)$ may be logged and retrieved by the administrator. However, in step S2, such stored problem solving procedures $PSP_j (SLA_j)$ may be automatically addressed, which are then retrieved in step 4. By this, the method may be rendered more and more autonomous over the time via self-learning based on a growing pool of $PSP_j (SLA_j)$.

However, the administrator may of course conduct problem solving on his part as well as analysing cascading effects or spend times to solve a problem. Both of the latter allows recognising root causes and gradually removing the symptom layer.

Figure 2:
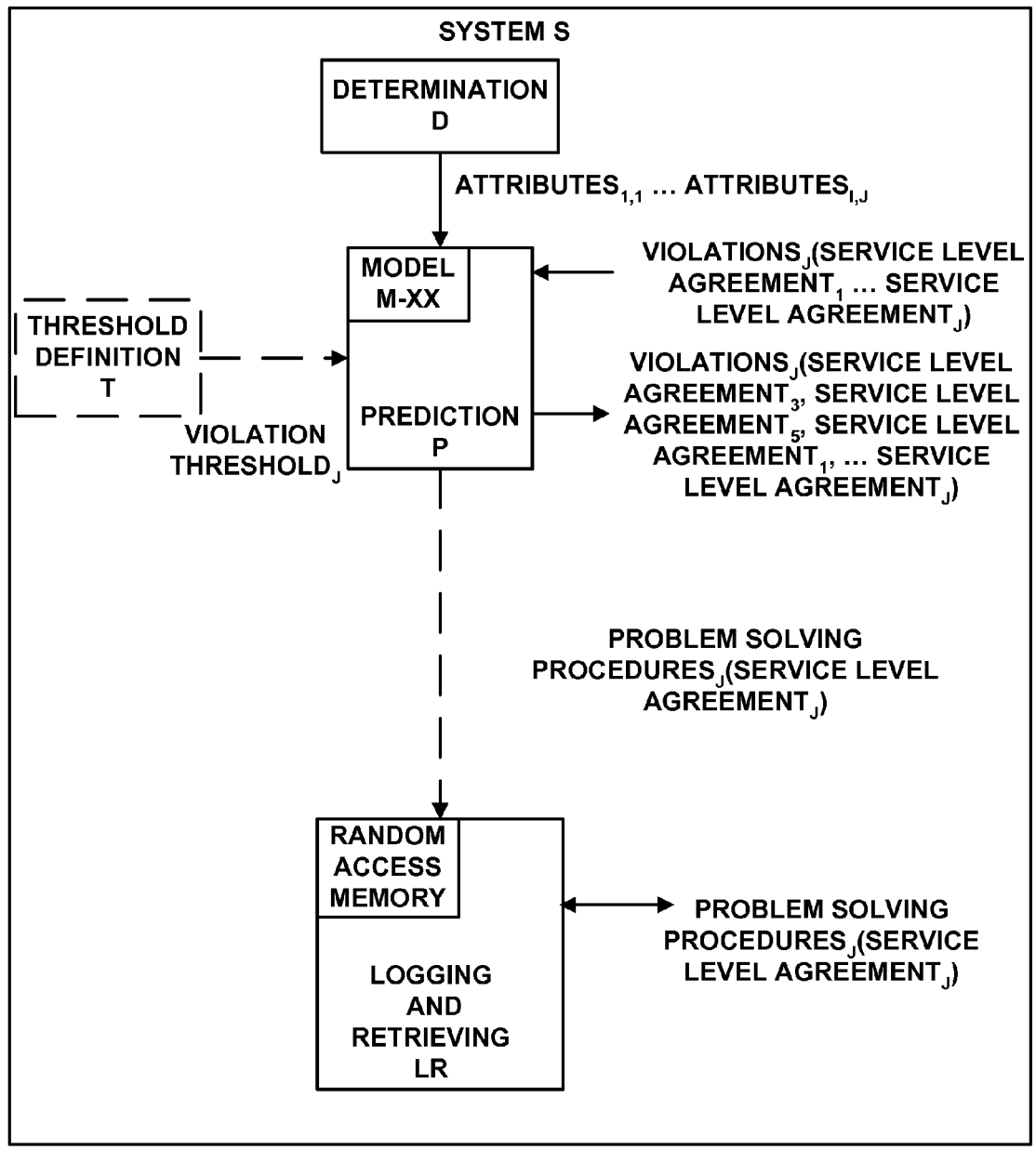
FIG. 2 a block diagram illustrating functions of an inventive system for ranking SLA violations, and FIG. 3 a diagram illustrating the relationship between attributes to the inventive method and system.

FIG. 2 shows a block diagram illustrating functions of an inventive system S for ranking SLA violations $V_j (SLA_1 \ldots SLA_j)$. In compliance with the inventive method described above, system S comprises an attribute determining means D (Determination) that determines a set of attributes $A_{1,1} \ldots A_{i,j}$ for $SLA_1 \ldots SLA_j$ subject to violation. Such attributes $A_{1,1} \ldots A_{i,j}$ are transferred to an importance predicting means P (Prediction), which predicts importance of SLA violations $V_j (SLA_1 \ldots SLA_j)$ using a model M-xx, which on the one hand is a model of ordinal regression M-OR. However, an additional model of heuristical evaluation M-HE (Model-Heuristical Evaluation) may be used. The latter model M-HE enables the administrator to decide a rank based on the heuristics in addition or as an alternative to the model of ordinal regression M-OR. This will further improve reliability of predicting the rank of a violation $V_j (SLA_1 \ldots SLA_j)$. A threshold definition means T may be provided for setting violation thresholds $VT_j$ to the model M-xx, e.g. for important system counters and periodic exceptions occurring in case a threshold $VT_j$ is violated. This will effect the ranking of violations $V_j (SLA_3, SLA_5, SLA_1, \ldots SLA_j)$ outputted from the importance predicting means P.

The administrator may however also log and reuse problem solving procedures $PSP_j (SLA_j)$ on his part by storing them in a memory of the logging and retrieving means LR, which in this example is a RAM (Random Access Memory). Though, problem-solving procedures $PSP_j (SLA_j)$ may be also be automatically addressed by the importance predicting means P. With a growing number of problem solving procedures $PSP_j (SLA_j)$ to be selected, the system S is rendered more and more autonomous.

Figure 3:
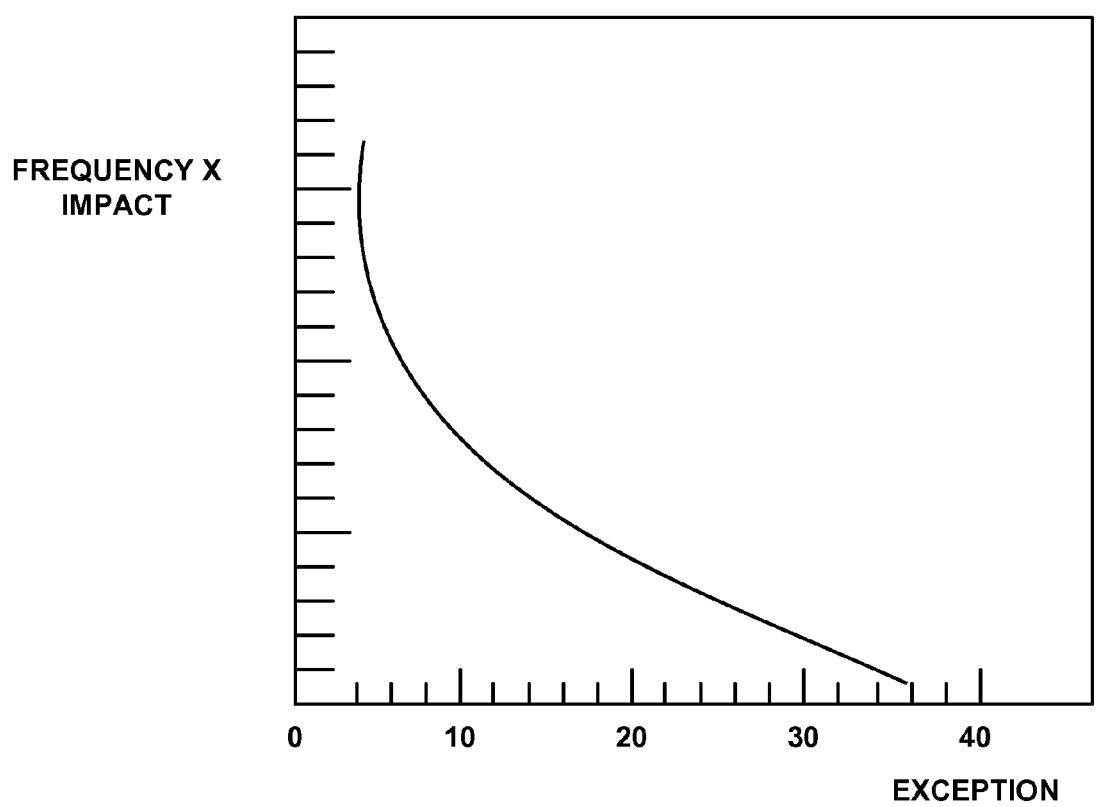

FIG. 3 shows a diagram illustrating the relationship between attributes to the inventive method and system S. Products of criteria can be used to increase the variance, making it easier to rank them. In this figure the frequency multiplied by impact is depicted. It is expected that 80% of the problems are caused by 20% of the exceptions. It needs to be investigated which products are most representative for the severity of an exception. In the below table an example is shown of ranked exceptions.

| Exception | Frequency [last 24 hrs] | Recency [min] | Recursion | PSE [hrs] | Impact | Related Rank problems | | Suggested Solving Path |
|---|---|---|---|---|---|---|---|---|
| #2 | 10 | 5 | High | 4 | Critical | 1 | Show | Show Execute |
| #1 | 5 | 60 | High | 1 | High | 2 | Show | Show Execute |

Multiple column sorting or weighing factors can be applied. Related problems are shown and a suggested executable solving path is offered, based on empirical data supplied by the user or the system. It is to noted that the numbers of columns displayed this table are only informative and restricted to 4 columns for space constraint and increase the visibility. Although FIG. 3 is based on the very simple model, which does not include business impact, the proposed embodiment takes in account a more complex attribute to rank the SLAs that have been violated and waiting to be treated.

As for a summary, present invention represents at least a semi-automated approach to rank SLA violations based on different criteria. A capability of the invention is to take in account different notions to rank such as the impact of the violation on a computer system. The method further provides for, but is not limited to, ranking based on business or system impact, frequency, recency, recursion, PSE and impact and relation to other problems, since this is more effective than ranking based on time or semantics. The proposed ranking method allows the user to focus on the most severe problems. Less important problems or problems that will go away automatically can be ignored. This approach is expected to save time and money as the impact of exceptions and the time to solve problems are reduced. Problem solving procedures pertaining to certain problems can be logged and reused by the user. The proposed invention also proposes a self-learning system that applies problem-solving procedures to violations, hereby gradually removing the symptom layer over time and rendering an autonomic system.

The present invention can be realized in hardware, software, or a combination of hardware and software. Any kind of computer system or other apparatus adapted for carrying out the methods described herein is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods.

Computer program means or computer program in the present context mean any expression, in any language, code or notation, of a set of instructions intended to cause a system having an information processing capability to perform a particular function either directly or after either or both of the following, namely conversion to another language, code or notation, or reproduction in a different material form.

Furthermore, the method described herein may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk, read only memory (CD-ROM), compact disk, read/write (CD-RW), and DVD.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without loosing their beneficial effects.

While the invention is susceptible to various modifications and alternative forms, the specific embodiment thereof are shown by way of example in the drawings and are described in detail. It should be understood, however, that the drawings and detailed description presented herein are not intended to limit the invention to the particular embodiment disclosed, but on to the contrary, the intention is to cover all modifications, equivalents, and alternatives falling within the spirit and the scope of the present invention as defined by the appended Claims.

The invention claimed is:

1. A computerized method for ranking Service Level Agreement violations, said method comprising:
    determining a set of attributes for Service Level Agreements subject to violation, wherein the attributes of the Service Level Agreements comprise at least one of a frequency of occurrence, recursion, age of a problem, a business or system impact, problem solving effort and relation to other problems;
    predicting importance of Service Level Agreement violations using a model, which performs ordinal regression, based on said attributes of Service Level Agreements, wherein the importance comprises an impact of the violation on a computer system, wherein the impact is expressed in a unit of currency of loss of profit; and defining products of the attributes as an attribute for predicting Service Level Agreement violations, wherein the defining the products of the attributes further comprises multiplying the frequency of occurrence by the system impact.

2. The method according to claim 1, further comprising predicting importance of the Service Level Agreement violations using a model, which performs heuristic evaluation based on said attributes of Service Level Agreements.

3. The method according to claim 2, further comprising adjusting the model, which performs heuristic evaluation.

4. The method according to claim 1, wherein a root cause of a Service Level Agreement violation is detected using attributes based on relationships between Service Level Agreements subject to violation.

5. The method according to claim 1, further comprising logging and reusing problem-solving procedures pertaining to Service Level Agreement violations.

6. The method according to claim 1, wherein business impact is measured based on a mapping of pecuniary or legal penalties, which are provided by a Service Level Agreement to loss of profit or increased costs effected thereby.

7. The method according to claim 1, wherein system impact is measured based on a mapping of system violations to loss of profit or increased costs effected thereby.

8. The method according to claim 6, wherein loss of profit or increased costs are represented using a domain of integer values.

9. The method according to claim 1, further comprising defining violation thresholds for attributes.

10. A computerized method for monitoring performance of a database comprising determining a set of attributes for Service Level Agreements subject to violation, wherein the attributes of the Service Level Agreements comprise at least one of a frequency of occurrence, recursion, age of a problem, a business or system impact, problem solving effort and relation to other problems;

Predicting importance of Service Level Agreement violations using a model, which performs ordinal regression, based on said attributes of Service Level Agreements, wherein the importance comprises an impact of the violation on a computer system, wherein the impact is expressed in a unit of currency of loss of profit; and defining products of the attributes as an attribute for predicting Service Level Agreement violations, wherein the defining the products of the attributes further comprises multiplying the frequency of occurrence by the system impact.

11. A system for predicting importance of Service Level Agreement violations, comprising a memory a neural network stored in the memory and operable to perform the method of claim 1.

12. A computer program loaded into the internal memory of a digital computer system comprising software code portions for performing a method according to claim 1 when said computer program is run on said computer system.

\* \* \* \* \*